(12) United States Patent
Marupaduga et al.

(10) Patent No.: US 12,506,523 B2
(45) Date of Patent: *Dec. 23, 2025

(54) DYNAMICALLY DETECTING AND CORRECTING THE DEACTIVATION OF BEAMFORMING

(71) Applicant: T-MOBILE INNOVATIONS LLC, Overland Park, KS (US)

(72) Inventors: Sreekar Marupaduga, Overland Park, KS (US); Andrew M. Wurtenberger, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 361 days.

This patent is subject to a terminal disclaimer.

(21) Appl. No.: 18/152,200

(22) Filed: Jan. 10, 2023

(65) Prior Publication Data

US 2023/0170961 A1 Jun. 1, 2023

Related U.S. Application Data

(63) Continuation of application No. 17/157,425, filed on Jan. 25, 2021, now Pat. No. 11,575,422, which is a continuation of application No. 15/621,742, filed on Jun. 13, 2017, now Pat. No. 10,979,115.

(51) Int. Cl.
| H04B 7/06 | (2006.01) |
| --- | --- |
| H04B 17/10 | (2015.01) |
| H04L 5/00 | (2006.01) |
| H04W 36/18 | (2009.01) |
| H04W 36/20 | (2009.01) |

(52) U.S. Cl.
CPC ........ *H04B 7/0617* (2013.01); *H04B 7/0632* (2013.01); *H04B 17/10* (2015.01); *H04L 5/0098* (2013.01); *H04W 36/18* (2013.01); *H04W 36/20* (2013.01)

(58) Field of Classification Search
CPC .... H04W 36/20; H04W 36/18; H04B 7/0632; H04B 7/0617; H04B 17/10; H04L 5/0098; H04L 5/0023
See application file for complete search history.

(56) References Cited

U.S. PATENT DOCUMENTS

| 5,295,071 | A | 3/1994 | Kuzma et al. | |
| --- | --- | --- | --- | --- |
| 9,507,008 | B1 | 11/2016 | Thiagarajan | |
| 10,129,283 | B1 | 11/2018 | Briggs et al. | |
| 10,979,115 | B1 * | 4/2021 | Marupaduga | H04B 17/10 |
| 2003/0139136 | A1 | 7/2003 | Pattabiraman | |
| 2005/0250543 | A1 | 11/2005 | Thermond | |

(Continued)

*Primary Examiner* — Noel R Beharry
*Assistant Examiner* — Rodrick Mak
(74) *Attorney, Agent, or Firm* — Shook, Hardy & Bacon L.L.P.

(57) ABSTRACT

Methods and systems are provided for dynamically detecting and correcting the deactivation of beamforming from an antenna. One or more users are identified as present within a particular geographic area typically served by beamforming, and the average signal strength of the one or more user devices is monitored. If a threshold level of degradation of the average signal strength is detected, then a beamforming status is determined for one or more of the antennas serving the user device or devices. Based on the determination, corrective measures are taken and beamforming is reactivated.

20 Claims, 5 Drawing Sheets

(56) References Cited

U.S. PATENT DOCUMENTS

| | | |
|---|---|---|
| 2006/0098580 A1 | 5/2006 | Li et al. |
| 2006/0229048 A1 | 10/2006 | Carroll et al. |
| 2007/0230403 A1 | 10/2007 | Douglas et al. |
| 2010/0184449 A1 | 7/2010 | Kim et al. |
| 2011/0207459 A1 | 8/2011 | Ramasamy et al. |
| 2012/0008510 A1 | 1/2012 | Cai et al. |
| 2015/0189520 A1 | 7/2015 | Lee et al. |
| 2016/0050001 A1* | 2/2016 | Kang .................. H04B 7/0421 370/329 |
| 2016/0165458 A1 | 6/2016 | Peng et al. |
| 2017/0126288 A1 | 5/2017 | Sandhu et al. |
| 2018/0006696 A1 | 1/2018 | Yue et al. |
| 2018/0026692 A1 | 1/2018 | Shanmugavadivel et al. |
| 2018/0046318 A1 | 2/2018 | Aurongzeb et al. |
| 2018/0192371 A1 | 7/2018 | Jung et al. |
| 2018/0352473 A1 | 12/2018 | Gunasekara et al. |
| 2018/0373326 A1 | 12/2018 | Gatson et al. |
| 2019/0261344 A1* | 8/2019 | Grant .................... H04B 7/086 |

\* cited by examiner

DYNAMICALLY DETECTING AND CORRECTING THE DEACTIVATION OF BEAMFORMING

CROSS-REFERENCE TO RELATED APPLICATIONS

This application is a continuation of U.S. patent application Ser. No. 17/157,425, filed Jan. 25, 2021, which is a continuation of U.S. application Ser. No. 15/621,742, filed Jun. 13, 2017, now U.S. Pat. No. 10,979,115, issued Apr. 13, 2021, which are hereby incorporated herein in their entirety by reference.

SUMMARY

The present disclosure is directed, in part, to dynamically detecting and correcting the deactivation of beamforming from an antenna or antennas, substantially as shown in and/or described in connection with at least one of the figures, and as set forth more completely in the claims.

In aspects set forth herein, a determination is made that beamforming from an antenna, or antennas, has been disabled or deactivated, and then corrective measures are taken to ensure that beamforming is reactivated. When beamforming becomes disabled or deactivated, users throughout a cell typically served by beamforming could have different levels of degradation of signal strength. This would equate to an overall negative effect to those users' quality of service. While, typically, beamforming failures have to be detected and fixed manually per antenna, here detection and correction of beamforming failures occurs dynamically, decreasing overall time and effort to restore signal strength and quality of service to the users being served in the area.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain aspects, methods are provided for dynamically detecting and correcting the deactivation of beamforming caused by one of various factors. For instance, if the average signal strength for one or more user devices located in a geographical area, traditionally served by beamforming, degrades beyond a threshold amount this could indicate that beamforming has been disabled. When this is the case, a beamforming status message can be requested to confirm the status of beamforming from one or more antennas. If beamforming is disabled, then corrective measures can be taken to reactivate beamforming.

Providing methods and systems for dynamically detecting and correcting the deactivation of beamforming has a wide array of beneficiaries, including the end user using the device in the area of beamforming and the service provider providing service to the device. The end user using the device would be provided clear technical benefits, for example better signal strength relating to overall better performance of their device. This is especially true for users using their device at the edge of the radiation from an antenna, also known as the cell edge. The service provider also is provided clear technical benefits. The service provider is not only able to provide a higher quality service to the end user, but is also able to identify and troubleshoot the deactivation of beamforming dynamically and quickly instead of attempting to identify and correct each beamforming deactivation manually.

In a first aspect, a method is provided for dynamically detecting and correcting the deactivation of beamforming from at least one antenna. The method comprises identifying one or more user devices present in a particular geographic area and monitoring an average signal strength measurement for user device, or devices. The method further comprises detecting a threshold level of degradation of the average signal strength for the user device or user devices and then determining, from an element management system, that the beamforming status of an antenna is disabled. Additionally, the method comprises, based on determining beamforming is disabled, reactivating beamforming.

In another aspect, a method is provided for dynamically detecting and correcting the deactivation of beamforming from at least one antenna. The method comprises detecting, based on an average signal strength measurement of one or more user devices, a threshold level of degradation in the signal strength measurement. The method further comprises triggering a beamforming status detection request by a radio, communicatively coupled to the antenna and an element management system, to the element management system. Further, the method comprises receiving, from the element management system, an indication that beamforming is deactivated and based on indication, determining a failure reason for the beamforming deactivation. Additionally, the method comprises reactivating the beamforming from the antenna or antennas.

In yet another aspect, a dynamic beamforming failure detection system is provided for dynamically detecting and correcting the failure of beamforming from at least one antenna. The dynamic beamforming failure detection system comprises a processor and one or more computer storage hardware devices storing computer-usable instructions that, when used by the processor, cause the processor to identify one or more user devices present in a particular geographic area, and determine that an average signal strength measurement of the one or more user devices has degraded by a threshold amount. The processor further communicates a beamforming status detection request. The processor additionally receives an indication that beamforming from the at least one antenna has been deactivated and then determines a failure reason for the deactivation of the beamforming. If the deactivation was caused by a failure of an antenna line device, the processor then resets the antenna line device and reactivates beamforming. Additionally, if the deactivation was caused by a beamforming calibration failure, the processor reactivates beamforming.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 25th Edition (2009).

Figure 1:
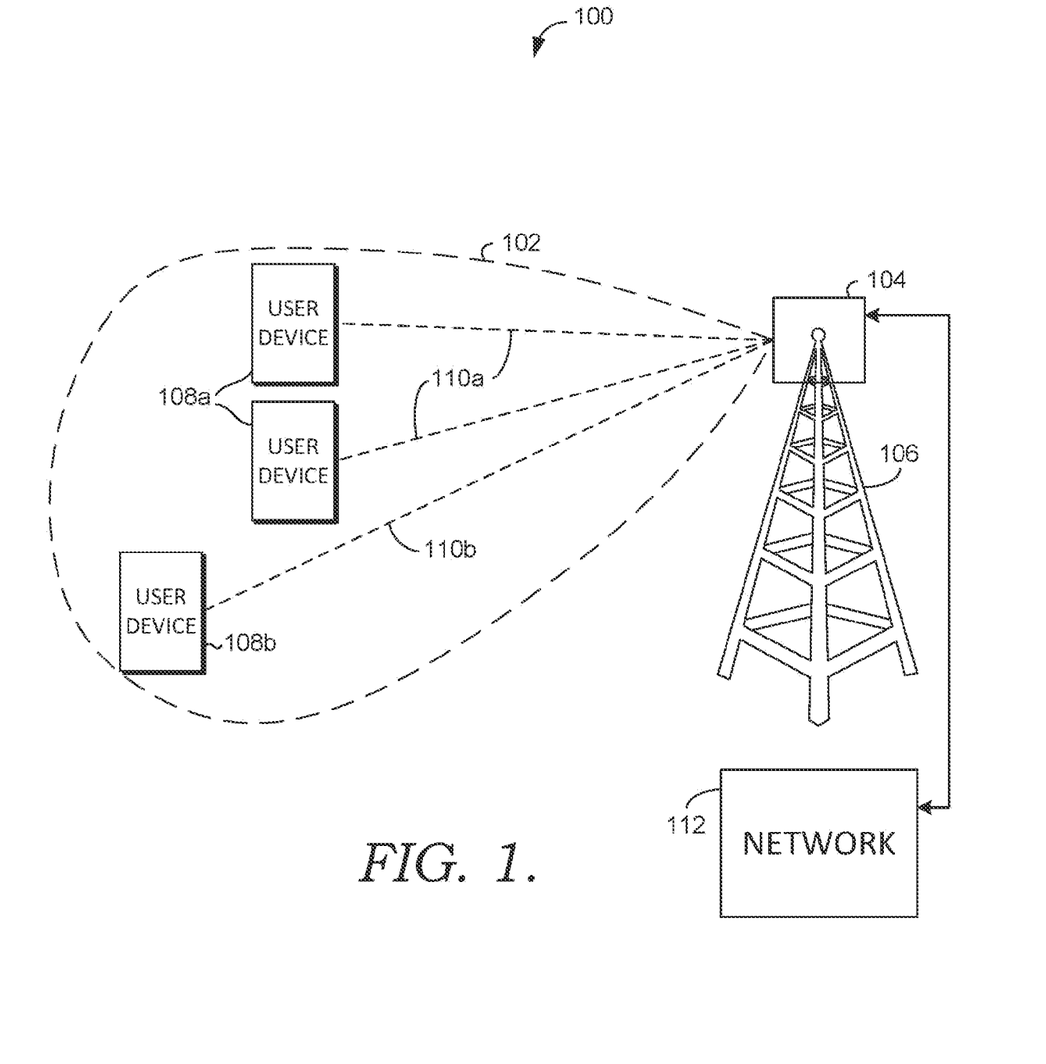
FIG. 1 depicts a diagram of a beam emitting from an antenna encompassing one or more user devices in a particular geographical area in accordance with implementations of the present disclosure.

FIG. 1 provides a diagram 100 which depicts a beam 102 emitting from an antenna 103 encompassing one or more user devices 108a and 108b in a particular geographical area in accordance with implementations of the present disclosure. In FIG. 1, a cell site 106 may include one or more antennas 104, base transmitter stations, radios, transmitter/receivers, digital signal processors, control electronics, GPS equipment, power cabinets or power supply, base stations, etc. In embodiments, the one or more antennas 104 are capable of using beamforming as at least one signal processing technique.

As shown, a beam 102 is emitted from the antenna or antennas 104 encompassing user devices 108a and 108b. In some embodiments, a user device or devices shown as 108a or 108b, may take the form of a wireless or mobile device capable of communication by utilizing a wireless telecommunication network(s). In this example, the user device can be any mobile computing device that communicates by way of a wireless network, for example, a 3G, CDMA, 4G, LTE, WiMAX, 5G or any other type of network.

Further, the cell site 106 may be communicatively coupled to a network 112, providing a possible communication link between the user device(s) 108a and 108b and the network 112. The network 112 may be a telecommunications network(s), or portion thereof. A telecommunications network might include one or more devices and components, such as base stations, servers, switches, relays, databases, nodes etc., which are not shown so as to not confuse other aspects of the present disclosure. Those devices and components can provide connectivity in a variety of implementations to form a network 112. In addition the network 112 can be utilized in a variety of manners, such as a single network, multiple networks, or as a network of networks, but, ultimately, is shown as simplified as possible to avoid the risk of confusing other aspects of the present disclosure.

As stated above, network 112 can be part of a telecommunication network that connects subscribers to their service provider(s). In embodiments network 112 could be associated with a specific telecommunication provider that provides services (e.g. LTE, voice, location, etc.) to user devices, such as user device(s) 108a or 108b. For example, user device(s) 108a or 108b may be subscribers to a telecommunication service provider, in which the users are registered or subscribed to receive voice and data services over the network 112. Network 112 may comprise any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), or a 5G network.

In general, beamforming has a wide variety of benefits, including, but not limited to, the increased possibility of increased signal strength received at the end user devices, the possibility of providing service to user devices located at the edge of a cell (a.k.a. cell edge) when under normal conditions the antenna could not radiate to that portion of the cell, improved interference handling, and better network efficiency for service providers. In some embodiments, the cell site 106 may be capable of communication with the user device or devices 108a and 108b in a particular geographical area by utilizing beamforming. As shown in FIG. 1, a beam 102 may be emitted or radiated from the antenna(s) 104 encompassing a portion of a particular geographical area where the user device or devices 108a or 108b are located, providing possible RF coverage for user device(s) 108a and 108b to communicate with network 112 via cell site 106.

As stated above, one possible advantage of beamforming is an increased possibility of increased signal strength received at the end user devices. As shown in FIG. 1, user device(s) 108a and 108b are located within the beam 102 emitted from the antenna(s) 104 and could possibly benefit from increased signal strength as reported from the user devices in 110a and 110b. In some embodiments, Reference Signal Received Quality ("RSRQ") is used as a measure of signal strength, but signal strength can be a measure Reference Signal Received Power ("RSRP"), Receive Strength Signal Indicator (RSSI), or any other measurement reflective of the received signal strength at a user device. Industry practice currently provides that RSRQ is measured in decibel ("dB") and RSRP is measured in decibel relative to a milliwatt ("dBm"). For simplicity, RSRQ will be used for the remaining of the disclosure for references to signal strength, but in no way should signal strength measurements be interpreted to be limited to just RSRQ.

In general, the increase of signal strength provided by beamforming can vary from each user device in a particular geographical area due to a large number of factors, e.g. distance between the user device and the antenna, the location of the device relative to the radiation cell edge, objects in the line-of-sight between the user device and the antenna, the topology of the particular geographical area, etc. By way of example, in FIG. 1, as shown user device(s) 108a and 108b are located within beam 102 in a particular geographical area and could benefit from an increase of at least 1 dB as measured and reported at 110a and 110b. However, due to factors such as user device(s) 110a being closer to the antenna than user device 110b the increase in signal strength 110a for user device(s) 108a could be higher than user device 108b. For example, user device(s) 108a could see increased signal strength of 3 dB and user device 108b could only see increase signal strength of 1 dB and the average signal strength in the particular geographical area for all user devices 108a and 108b would be 2 dB.

By monitoring the average signal strength, as represented in FIG. 1 by the average of 110a and 110b of user device(s) 108a and 108b in a particular geographical area, an increase or degradation of overall signal strength can be detected. In some embodiments, the one or more user devices 108a and 108b are identified within the particular geographic area to select which devices are located within the particular geographical area. This can be accomplished by use of triangulation, GPS, round-trip time, trilateration, by identifying the physical cell identifier ("PCI") serving the user device(s) 108a and 108b, or any other means readily available.

In one embodiment, monitoring of the average signal strength 110a and 110b could take place in real-time or over the course of 30 seconds, 1 minute, 2 minutes, 5 minutes, 10 minutes, 60 minutes, 2 hours, 4 hours, or any amount of time determined by a network or service operator or owner. In some embodiments the average signal strength could be monitored by an antenna, radio, element management system, or another element of the network 112. Degradation of overall average signal strength in a particular geographical area, traditionally served by beamforming could be an indication that beamforming has become disabled or deactivated. In one embodiment, a threshold level of degradation of the average signal strength, 110a and 110b, of one or more device(s), 108a and 108b, possibly indicating the deactivation of beamforming is set by a network or service operator.

Figure 2:
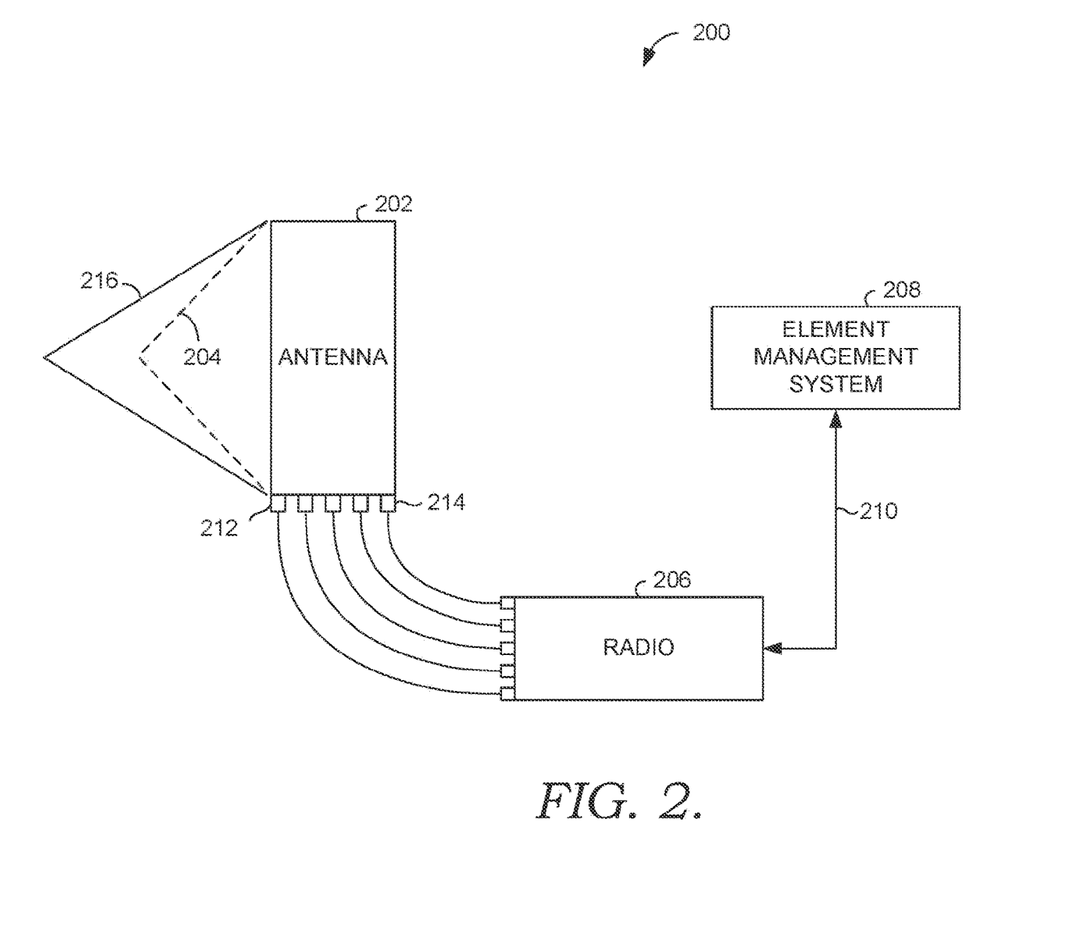
FIG. 2 depicts a diagram of an exemplary network environment, including an antenna where beamforming is shown disabled and shown reactivated, in which implementations of the present disclosure may be employed.

FIG. 2 provides a diagram 200 of an exemplary network environment, including an antenna 202, where beamforming is disabled 204, communicatively connected to a radio, which in turn is communicatively connected to an element management system. It should be noted that an element management system (EMS) manages one or more functions or capabilities between one or more network elements throughout a telecommunications network. Referring to FIG. 2, which provides a diagram 200 of an exemplary network environment, including an antenna 202 where beamforming is disabled 204, if a threshold level of degradation of the average signal strength of one or more users is detected then a beamforming status should be determined.

In one embodiment, if a threshold level of degradation of the average signal strength of the one or more devices is detected then a beamforming status of one or more antennas 202 is determined from an element management system 208. This determination can be made by radio 206, or the antenna(s) 202 through the radio 206, by way of a beamforming status detection request 210 to the element management system 208. If the determination that the status of beamforming at the antenna(s) 202 is deactivated then proper steps should be taken to reactivate beamforming 216 from the antenna(s) 202.

In one embodiment the antenna 202 is connected to an antenna line device 212. An antenna line device 212 may include, but is not limited to, a single remote electrical tilt unit, a double remote electrical tilt unit, a dual tower mounted amplifier ("DTMA"), a multi-band tower mounted amplifier, signal splitters, a lightning protection device, a band-pass filter, a duplexer, a Smart Bias Tee, a same-band combiner, a duplex hybrid combiner, a dual-band combiner, a triple-band combiner, or a quad-band combiner.

In some instances a failure of an antenna line device such as 212 could cause beamforming at an antenna to become deactivated 204. In one embodiment the antenna line device 212 is a remote electrical tilt unit and in some instances a remote electrical tilt unit can cause beamforming to deactivate if the remote electrical tilt unit is initially set up incorrectly, fails to maintain communication with an element management system, fails to operate per normal operation, loses power, or for any reason that would cause the remote electrical tilt to cease to operate as it would in normal operation.

In the scenario described above, if the failure of the antenna line device 212, which in this embodiment is a remote electrical tilt unit, is the cause of deactivation 204 of beamforming from the antenna, then the antenna line device 212 is instructed by either the element management system 208 or the radio 206 to reset or be powered back on in the event of power interruption. The element management system 208 then may instruct directly to the antenna(s) 202 or via the radio 206 to reactivate 216 beamforming from the antenna 202.

In yet another embodiment the antenna 202 may be communicatively connected to an antenna calibration unit 214. The antenna calibration unit 214 may reside within the antenna configuration and be communicatively connected to the radio 206 via an antenna calibration port. In some instances, antenna calibration errors could lead to the deactivation of beamforming 204. Antenna calibration errors could include failure of a calibration unit 214 to complete a calibration, the failure of the calibration unit 214 to confirm to the element management system 208 a calibration completion, a failure of the calibration unit 214 to receive a calibration request from the element management system 208, a failure of the calibration unit 214, or other scenarios that would prevent calibration to be completed. In these instances, if the calibration is not completed then beamforming could be disabled or deactivated 204.

In the scenario described above, if the deactivation of beamforming 204 is due to a calibration fault or the antenna calibration unit 214, then the element management system 208 may request another calibration from the antenna calibration unit 214. However, the element management system 208 may skip this request and instead instruct directly to the antenna(s) 202, or via the radio 206, to reactive 216 beamforming from the antenna 202.

Figure 3:
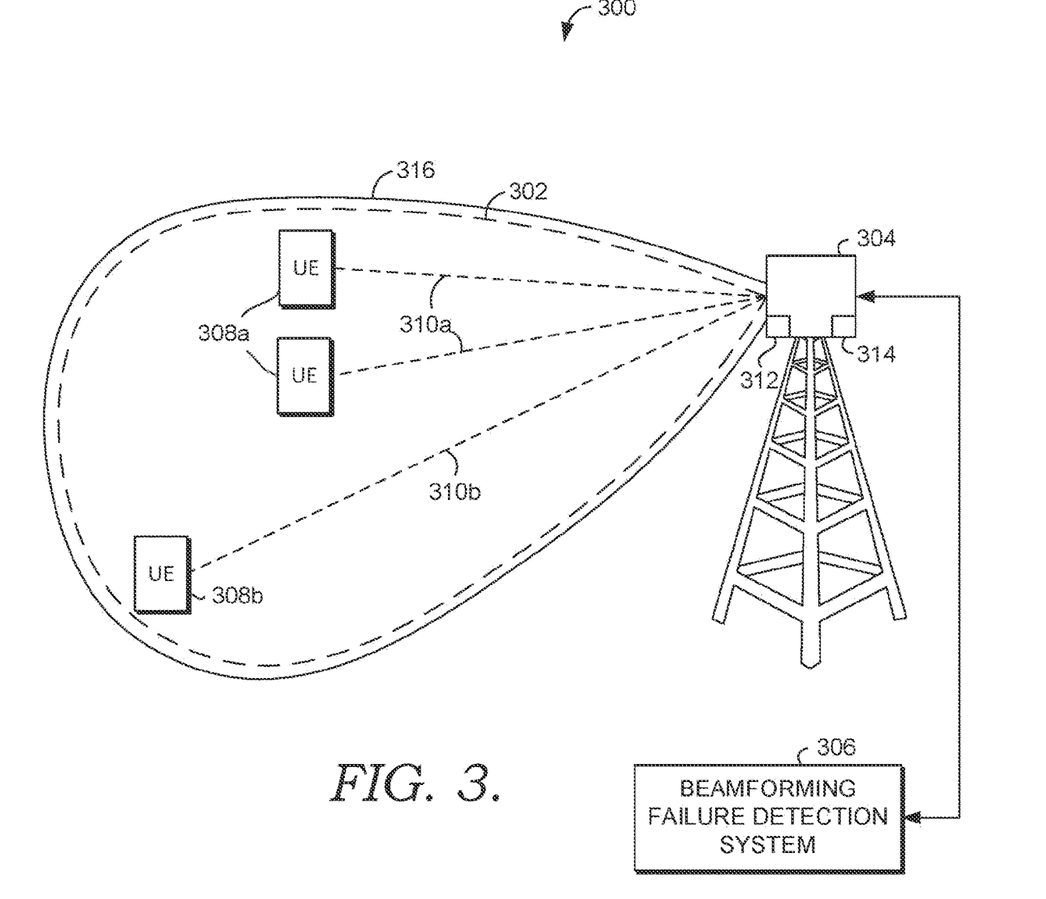
FIG. 3 depicts a diagram of a dynamic beamforming failure detection system, including an exemplary network environment, for dynamically detecting the failure of beamforming from at least one antenna and taking corrective action to reactivate beamforming, in which implementations of the present disclosure may be employed.

Now turning to FIG. 3, a diagram 300 depicting a dynamic beamforming failure detection system 308 is provided for dynamically detecting the failure of beamforming 302 from at least one antenna and taking corrective action to reactivate beamforming 304. The dynamic beamforming failure detection system 308 comprises a processor and one or more computer storage hardware devices storing computer-usable instructions that, when used by the processor, cause the processor to identify one or more user devices 310a and 310b present in a particular geographic area, and determine that an average signal strength measurement, shown in FIG. 3 as the average of 312a and 312b, of the one or more user devices 310a and 310b has degraded by a threshold amount. The processor further communicates a beamforming status detection request. The processor additionally receives an indication that beamforming from the at least one antenna has been deactivated 302 and then determines a failure reason for the deactivation of the beamforming. If the deactivation was caused by a failure of an antenna line device 314, the processor then resets the antenna line device 314 and reactivates beamforming. Additionally, if the deactivation was caused by a beamforming calibration failure 316, the processor reactivates beamforming 304.

Figure 4:
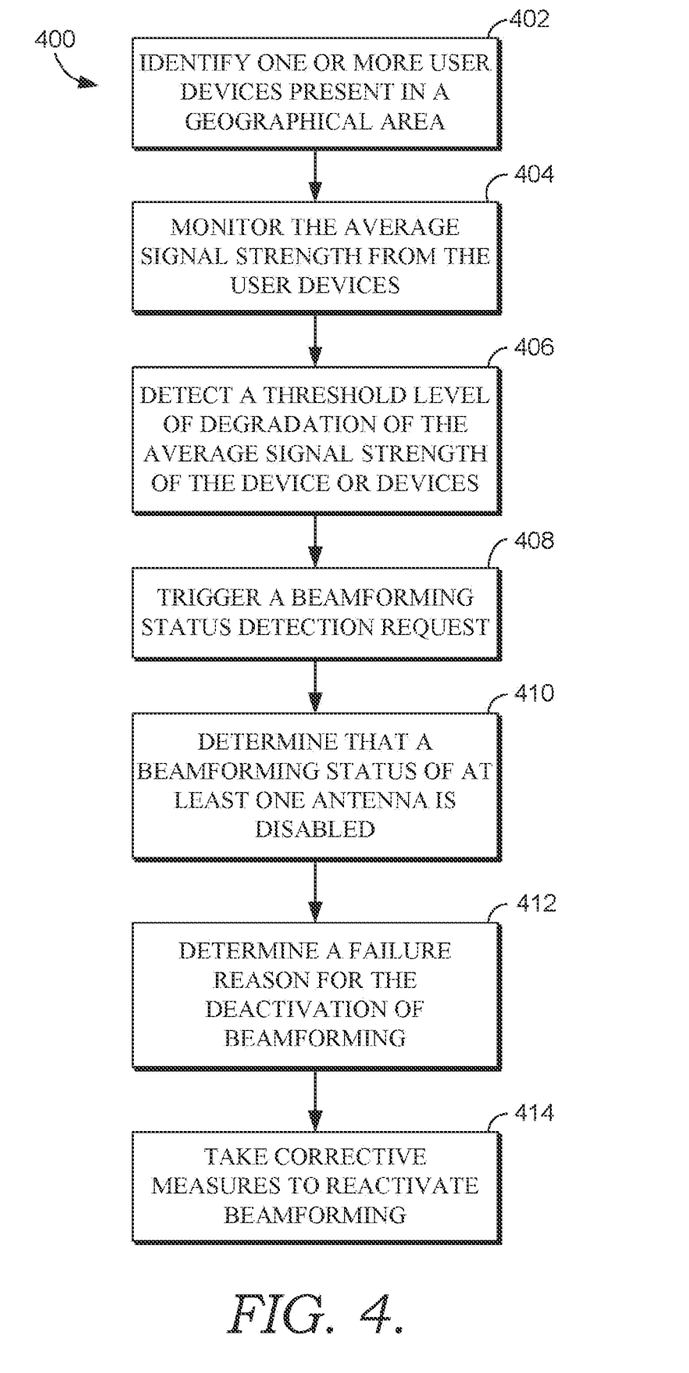
FIG. 4 depicts a flow diagram of an exemplary method for dynamically detecting and correcting the deactivation of beamforming, in accordance with implementations of the present disclosure.

FIG. 4 depicts a flow diagram of an exemplary method 400 for dynamically detecting and correcting the deactivation of beamforming, in accordance with implementations of the present disclosure. Initially at block 402 one or more user devices are identified as present in a geographical area. In some embodiments this geographical area is typically served by beamforming. As mentioned previously, the user device or devices may be identified through the use of tri-angulation, GPS, round-trip time, trilateration, by identifying the physical cell identifier ("PCP") serving the user device or devices, or any other means readily available.

At block 404, the average signal strength of the user device or devices, identified in the particular geographical area in block 402, is monitored. The signal strength may be any measurement of RSRQ, RSRP, RSSI or any other available signal strength measurement available. The signal strength measurements of the user device(s) is averaged and then monitored. The monitoring of the average signal strength measurements can be, in some embodiments, monitored by the antenna, radio, element management system, or another element of the network. Monitoring of the average signal strength measurement of a user device or devices in an area typically served by beamforming can serve numerous purposes. One purpose could be to set a baseline average signal strength for the area when beamforming is enabled or disabled. This monitoring could occur in real-time or over the course of 30 seconds, 1 minute, 2 minutes, 5 minutes, 10 minutes, 60 minutes, 2 hours, 4 hours, or any amount of time determined by a network or service operator or owner, and if, for instance, a drop in the average signal strength by at least a threshold amount is detected, as in block 406, it could be an indication that beamforming in the area has failed, been disabled, or has been deactivated.

If a drop in the average signal strength of the one or more devices is detected, then a beamforming status detection request should be sent or requested as in block 408. This beamforming status detection request could be initiated or sent by the antenna, a radio, an element management system, or another network element. At block 410, a determination is made indicating that the beamforming status of at least one antenna is disabled. Beamforming can be disabled for a number of reasons and therefore, as in block 412, a failure reason for the deactivation of beamforming should be made. For example, in some instances, beamforming could be deactivated due to the failure of an antenna line device. In yet other instances, beamforming could be deactivated due to a beamforming calibration failure.

At block 414, corrective measures to reactivate beamforming from the antenna or antennas are taken. In some instances, if beamforming is deactivated due to the failure of an antenna line device, then the antenna line device should be reset or restored to power and then beamforming should be reactivated. In other instances, if beamforming is deactivated due to a calibration failure then a new calibration could be requested or beamforming could be reactivated with disregard to the calibration failure.

Embodiments of our technology, stated above, may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 5:
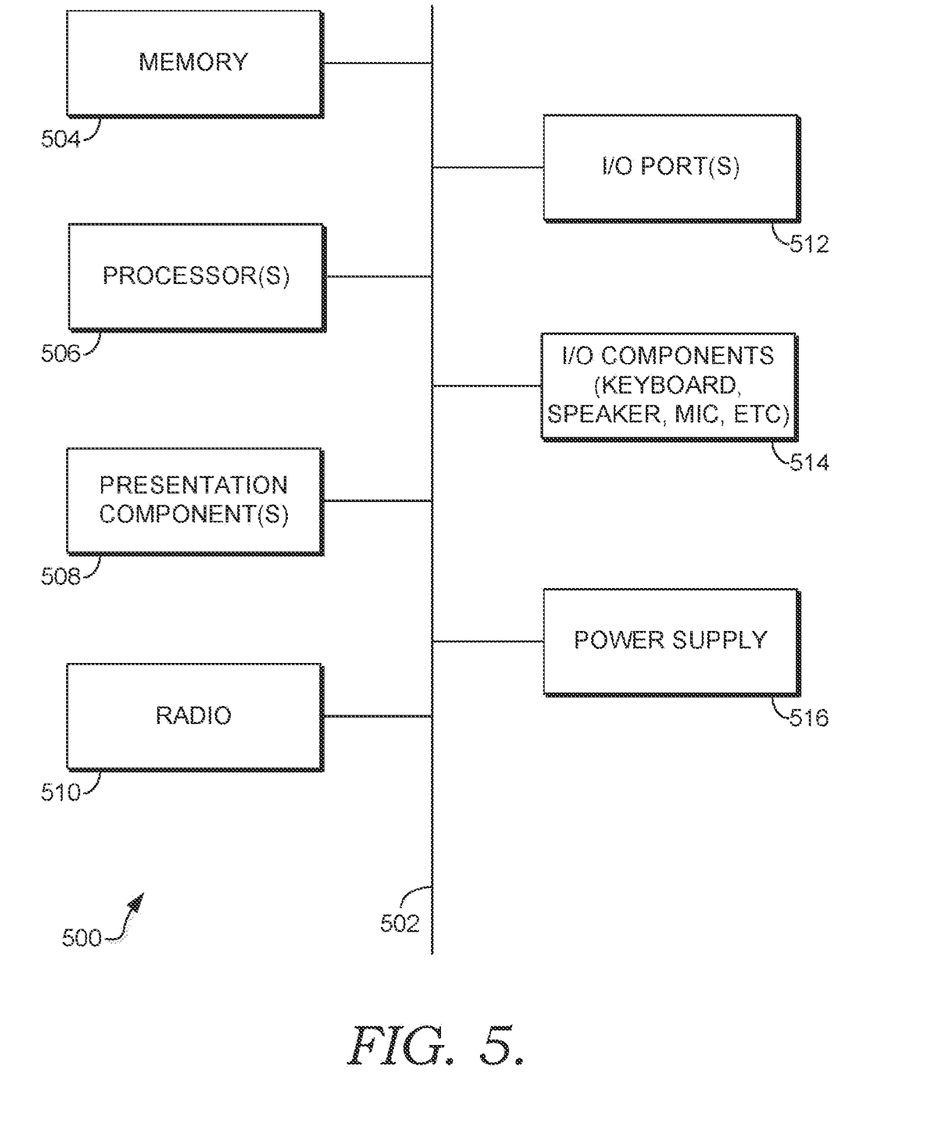
FIG. 5 depicts a diagram of an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 512, I/O components 514, and power supply 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 510 represents a radio that facilitates communication with a wireless telecommunications network. Illustrative wireless telecommunications technologies include CDMA, GPRS, TDMA, GSM, and the like. Radio 510 might additionally or alternatively facilitate other types of wireless communications including Wi-Fi, WiMAX, LTE, or other VoIP communications. As can be appreciated, in various embodiments, radio 510 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically detecting and correcting the deactivation of a beam emitted from at least one antenna at a cell site, the method comprising:
    detecting that an overall reference signal receive quality (RSRQ) has degraded by a threshold amount;
    determining, by an element management system associated with the at least one antenna, that one or more beamforming components of the cell site are deactivated; and
    based on determining that the one or more beamforming components of the cell site are deactivated, reactivating the one or more beamforming components of the cell site.

2. The method of claim 1, further comprising communicating a beamforming status message to the at least one antennae.

3. The method of claim 1, wherein the one or more beamforming components of the cell site are reactivated by a processor associated with the cell site.

4. The method of claim 2, wherein the beamforming status message is communicated by a radio communicatively coupled to the at least one antennae.

5. The method of claim 1, wherein the overall reference signal receive quality is associated with a predetermined geographic area.

6. The method of claim 1, further comprising determining a failure reason for the deactivation of the one or more beamforming components.

7. The method of claim 6, wherein the failure reason is associated with an antennae line device.

8. The method of claim 7, wherein reactivating the one or more beamforming components further comprises restoring power to the antenna line device.

9. One or more computer storage media having computer-executable instructions embodied thereon, that when executed, configure a computing device to perform a method of dynamically detecting and correcting the deactivation of a beam emitted from at least one antenna at a cell site, the method comprising:

detecting a threshold level of degradation of an overall referenced signal receive quality (RSRQ) for a user device of a plurality of user devices;

determining, by an element management system associated with at least one antenna, that one or more beamforming components of a cell site are deactivated; and based on determining that the one or more beamforming components of the cell site are deactivated, reactivating the one or more beamforming components of the cell site.

10. The method of claim 9, wherein the overall reference receive quality is monitored over a predetermined period of time.

11. The method of claim 9, wherein the cell site comprises the at least one antennae and one or more of a base transmitter, a radio, a transmitter, a receiver, and a base station.

12. The method of claim 9, wherein the cell site is associated with a telecommunication network.

13. The method of claim 12, wherein the telecommunication network comprises one or more of a server, a switch, a relay, a database, and a node.

14. The method of claim 9, wherein the plurality of user devices are located in a predetermined geographical area.

15. A dynamic beamforming failure detection system at a cell site for dynamically detecting and correcting the failure of a beam emitting from at least one antenna at the cell site, the dynamic beamforming failure detection system comprising:

a processor; and one or more computer storage hardware devices storing computer-usable instructions that, when used by the processor, cause the processor to:

determine that an overall reference signal receive quality (RSRQ) has degraded by a threshold amount;

determine, by an element management system associated with at least one antenna, that one or more beamforming components of the cell site are deactivated; and based on determining that the one or more beamforming components of the cell site are deactivated, reactivate the one or more beamforming components of the cell site.

16. The dynamic beamforming failure detection system of claim 15, wherein the overall reference signal receive quality is associated with a predetermined number of user devices.

17. The dynamic beamforming failure detection system of claim 16, wherein the predetermined number of user devices are located within a predetermined geographic area.

18. The dynamic beamforming failure detection system of claim 16, further comprising, subsequent to reactivating the one or more beamforming components of the cell site, communicating a status request to at least one of the predetermined number of user devices.

19. The dynamic beamforming failure detection system of claim 15, wherein the cell site comprises the at least one antennae and one or more of a base transmitter station, a radio, a transmitter, a receiver, and a base station.

20. The dynamic beamforming failure detection system of claim 15, wherein the cell site is associated with a telecommunication network.

* * * * *